United States Patent [19]
Bond

[11] Patent Number: 4,887,927
[45] Date of Patent: Dec. 19, 1989

[54] QUICK DISCONNECT APPARATUS FOR A LOADER BOOM

[76] Inventor: Irvin D. Bond, 10270 Allen Rd., Clarkston, Mich. 48016

[21] Appl. No.: 156,411

[22] Filed: Feb. 16, 1988

[51] Int. Cl.$^4$ .............................. F16B 7/04; F16L 3/08
[52] U.S. Cl. ...................................... 403/68; 403/344; 403/399; 248/74.1; 248/62
[58] Field of Search ................ 403/344, 319, 331, 380, 403/389, 399, 396, 188, 186, 68, 59, 61, 13, 156, 3, 167; 248/62, 73, 74.1, 544, 225.31, 220.2, 222.2

[56] References Cited

U.S. PATENT DOCUMENTS

| | | | |
|---|---|---|---|
| 3,961,854 | 5/1976 | Jaquet | 403/68 X |
| 4,275,872 | 6/1981 | Mullis | 403/399 X |
| 4,547,092 | 10/1985 | Vetter et al. | 403/59 |
| 4,619,545 | 10/1986 | Küttenbaum | 403/344 X |
| 4,676,472 | 6/1987 | Kamrud, Sr. | 248/74.1 X |
| 4,744,149 | 5/1988 | Perna | 248/74.1 X |

FOREIGN PATENT DOCUMENTS 2504222  8/1976  Fed. Rep. of Germany ........ 248/62

Primary Examiner—Randolph A. Reese
Assistant Examiner—Peter M. Cuomo
Attorney, Agent, or Firm—Charles W. Chandler

[57] ABSTRACT

A quick disconnect for suspending a generally horizontal boom from a support. A pair of spaced blocks are clamped on the boom. One block has a slot and the other block has a hanger pin. An elongated body is attached to the support. A head at one end of the body has a slot for receiving the hanger pin on the block. A second head, at the other end of the body, has a threaded hanger pin for receiving the slot on the other block so that the boom is supported parallel to the body. The two heads have a pair of detent pins receivable in openings in the two blocks to prevent the boom from pivoting about the hanger pins. The threaded hanger pin has a handle which the user can manipulate to easily connect one of the blocks to the body.

3 Claims, 2 Drawing Sheets

QUICK DISCONNECT APPARATUS FOR A LOADER BOOM

BACKGROUND OF THE INVENTION

This invention is related to apparatus for either connecting or disconnecting a boom from a support, and more particularly to a disconnect which permits the user to release the boom by manipulating a handle on the disconnect, and then raising the boom to separate it from the disconnect.

Many industrial situations have a moving assembly line. Tooling or other apparatus is mounted on a boom suspended from a support adjacent the assembly line. The boom may, for example, support tooling for performing an operation on the workpiece as it is being advanced, or, the boom may support vacuum cup means for raising and lowering a workpiece. When the tooling is to be changed, the boom must be released from the support from which it is suspended, and replaced with a boom having a substitute tooling.

The boom is typically a cylindrical, elongated, tubular member. Various devices are conventionally used for connecting the boom to the support. Such conventional devices normally require the user to use a tool such as a wrench. This means that the user must take the time to either locate an appropriate tool or locate someone who has the use of such a tool, before the boom can be released.

SUMMARY OF THE INVENTION

The broad purpose of the present invention is to provide a disconnect for quickly and easily suspending a boom from a support, without the use of a wrench. In the preferred embodiment of the invention, the disconnect includes an elongated body having a pair of spaced heads. The first head has a hook-shaped slot and a detent pin. The second head, at the other end of the body, has a second detent pin aligned with the first detent, and a threaded first hanger pin.

A pair of blocks are clamped on the boom and spaced a distance corresponding to the distance between the heads on the body. One clamping block has a second hanger pin receivable in the hook-shaped slot in the first head, and an opening for receiving the first detent pin. The other clamping block has a hook-shaped slot for receiving the first hanger pin, and a second opening for receiving the detent on the second block.

The boom is easily connected to the support by first hooking the threaded pin in the slot on the first clamping block. The user then swings the rear of the boom down to the hook the threaded hanger pin into the slot on the other clamping block. He slides the boom forward to engage the two detent pins in their respective openings. He then hand-tightens the threaded pin to clamp the second block to the body. He reverses the installation sequence to separate the boom from the body.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which.

DESCRIPTION OF THE PREFERRED EMBODIMENT

Figure 1:
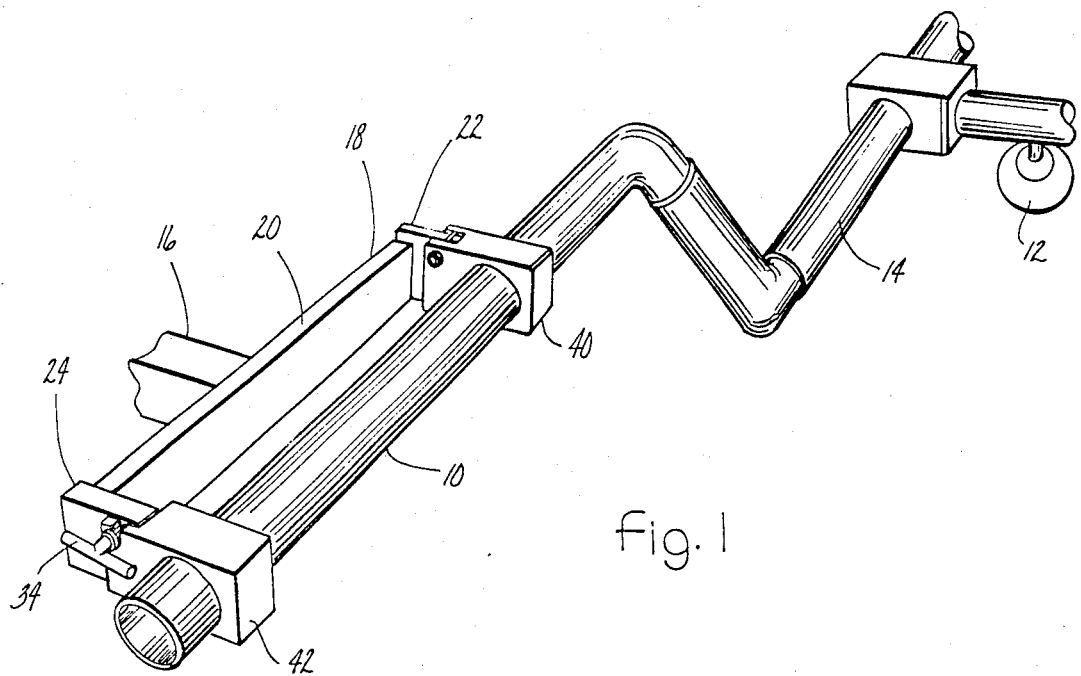
FIG. 1 is a view of a boom having one end supporting a vacuum cup means, and its other end suspended from a support by disconnect means illustrating the preferred embodiment of the invention.
Figure 3:
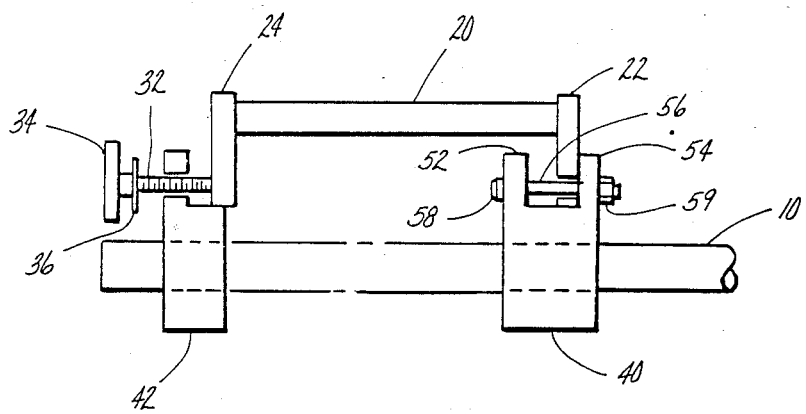
FIG. 3 is a plan view of the boom connected to the disconnect to illustrate the installation sequence.

Referring to the drawings, FIG. 1 illustrates a generally cylindrical tubular boom 10 having one end supporting vacuum cup means 12 on arm 14. The vacuum cup means is shown solely by illustrative purposes. A variety of tooling means may also be supported on the outer end of the boom. The boom is suspended from a support 16 by a quick disconnect means 18, illustrating the preferred embodiment of the invention.

Figure 2:
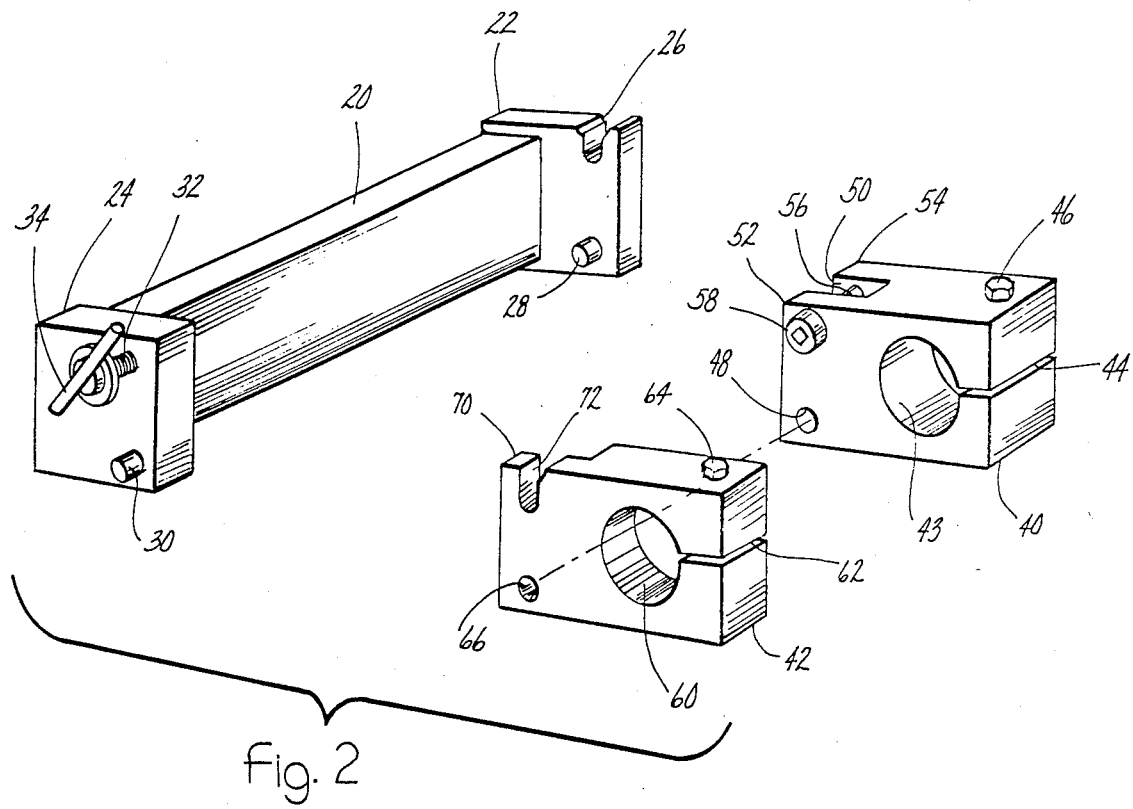
FIG. 2 is a view illustrating the disconnect removed from the boom.

Referring to FIG. 2, disconnect means 18 includes an elongated body 20 having enlarged block-shaped ends forming heads 22 and 24. Head 22 has a slot 26 in its upper surface, and a detect pin 28 below the slot. Pin 28 is supported with its longitudinal axis generally parallel to the longitudinal axis of slot 26.

Head 24 has a lower detent pin 30 aligned with detent pin 28. Detent pin 28 extends rearwardly from head 24.

A threaded hanger pin 32 is mounted above pin 30 for rotation about an axis aligned with the longitudinal axis of slot 26. Hanger pin 32 is elongated and extends rearwardly of head 24. Handle 34 is mounted on the extreme end of pin 32. A washer 36 is carried on the hanger pin between the handle and head 24.

A pair of clamping blocks 40 and 42 are mounted on boom 10. Block 40 has a bore 43 for slideably receiving the boom. The block also has a split side 44 so that bore 43 can be enlarged to receive the boom and then clamped on the boom by socket head set screw means 46.

Block 40 also has a pin-receiving opening 48 for receiving detent pin 28. The block has an opening 50 between a pair of shoulders 52 and 54. A second hanger pin 56 is suspended between shoulders 52 and 54. Pin 56 is preferably a threaded fastener having a head 58 at one end and a nut 59 at the other end. Opening 50 has a width greater than the width of block 22 so that hanger pin 56 can be hooked into slot 26.

Block 42 also has a cylindrical bore 60 for receiving boom 10, and a slotted side 62 that permits the bore diameter to be increased to receive the boom. A socket head set screw 64 mounted on the slotted side 62 is operative to clamp the boom on the block in the manner well known to those skilled in the art.

Block 42 also has a pin-receiving opening 66 for receiving detent pin 30.

The two clamping blocks are mounted on the boom so that openings 48 and 66 are aligned, one with the other.

Block 42 also has a narrow shoulder 70 above opening 66. Shoulder 70 has a slot 72 for receiving hanger pin 32. The width of shoulder 70 is such that pin 32 can be unscrewed to a position in which it can be inserted in slot 72 without fully disengaging the pin from head 24. When hanger pin 32 is received in slot 72, the handle can then be rotated to clamp shoulder 70 between washer 36 and head 24.

The installation or connecting sequence is that the user hooks hanger pin 56 into slot 26, at the forward head of the body. He then swings the rear end of the boom down to hook slot 72 under hanger pin 32. When openings 48 and 66 are aligned with detent pins 28 and 30, respectively, he then slides the boom assembly forward so that the two pins are received in their respective openings. He then hand-tightens pin 32 by manipulating handle 34. The weight of the boom then rests on the two hanger pins as well as the detent pins. The detent pins cooperate to prevent the boom from being rotated about body 20.

The boom can then be removed by reversing the sequence, that is, by rotating the handle to unclamp block 42 from the body, sliding the two blocks off the two detent pins and then removing the hanger pins from their respective slots.

Having described my invention, I claim:

1. Apparatus for releasably suspending a tubular boom from a support, comprising:
   a body connected to the support, the body having first slot means open at one side of the body;
   a first block and a second block mounted on the boom in a spaced relationship;
   a first hanger pin carried on the first block and adapted to be received transversely in said first slot means;
   the second block having second slot means open at one side of the second block;
   a threaded second hanger pin carried on the body, and receivable transversely in the second slot means, whereby the first and second blocks and the tubular boom are suspended from the body at such times as the first hanger pin on the first block is received in the first slot means, and the second hanger pin is received in the second slot means;
   the threaded second hanger pin being colinearly aligned with the first hanger pin when the boom is suspended from the body; and
   means carried on the threaded second hanger pin for releasably clamping the second block to the body upon rotation of the threaded second hanger pin;
   a detent pin carried on the body and a complementary pin-receiving opening carried on one of said blocks, the detent pin being receivable in the pin-receiving opening by a motion of the block with respect to the opening parallel to the longitudinal axis of the pin to a position in which the pin is operative to prevent pivotal motion of the block about the axis of rotation of the threaded second hanger pin.

2. A combination as defined in claim 1, including a second detent pin carried on the body, the second of said blocks having a second pin-receiving opening for receiving the second detent pin to cooperate with the first detent pin in preventing the boom from being moved in a pivotal motion with respect to the body.

3. Apparatus for releasably suspending a tubular boom from a support, comprising:
   body means connected to the support, the body means comprising an elongated member and first and second spaced-apart heads, the body means having first slot means located in an upward facing surface of the first head;
   a block means comprising a first block and a second block mounted on the boom in a spaced relationship;
   a first hanger pin carried on the first block and adapted to be received transversely in said first slot means;
   the second block having second slot means open at one side of the second block;
   a threaded second hanger pin carried on the second head, and receivable transversely in the second slot means, whereby the first and second blocks and the tubular boom are suspended from the body means at such times as the first hanger pin on the first block is received in the first slot means, and the threaded second hanger pin is received in the second slot means;
   first engagement means on the body means;
   second engagement means on the block means; and
   means carried on the threaded second hanger pin for releasably clamping the second block on the body means and for causing the first engagement means to engage the second engagement means upon rotation of the threaded hanger pin to hold the block means in predetermined alignment with the body means;
   the first block comprising two portions spaced apart in the longitudinal direction of the tubular boom and defining third slot means therebetween, the first hanger pin spanning the third slot means, and the thickness of the portion of the first head in which the first slot means is located, is less than the width of the third slot means to fit loosely therein; and
   one of the engagement means being a detent projection and the other engagement means is a matching detent recess, the length of the detent projection plus the thickness of said portion of the first head being less than the width of the third slot means.

* * * * *